United States Patent Office 2,987,298
Patented June 6, 1961

2,987,298
METHOD OF WELL COMPLETION
Clarence O. Walker, Houston, and Walter J. Weiss, Sugar Land, Tex., assignors to Texaco Inc., a corporation of Delaware
No Drawing. Filed June 18, 1958, Ser. No. 742,719
3 Claims. (Cl. 166—29)

This invention relates to drilling muds. More particularly, this invention relates to the treatment of drilling muds in order to improve the high temperature properties thereof. In accordance with one embodiment the practice of this invention is directed to the preparation of a packer fluid having relatively improved high temperature gelation properties as compared with conventional drilling fluids. In accordance with yet another embodiment the practice of this invention is directed to a method for the preparation of a packer fluid having improved high temperature gelation properties from a conventional drilling fluid having less than desirable high temperature gelation properties.

Frequently during the drilling of a bore hole through subsurface formations relatively high temperatures are encountered with the result that the drilling mud being circulated within the bore hole is subjected to temperatures in excess of 250° F., such as a temperature in the range 300–450° F. Under high temperature and quiescent conditions drilling fluids, particularly lime-base or lime-containing drilling fluids, undergo a phenomenon known as high temperature gelation. During high temperature gelation the viscosity and shear value of the drilling mud markedly increases with the result that the drilling fluid becomes very difficult to pump and maintain fluid, and sometimes eventually the drilling mud is transformed into a hard, cement-like mass. Accordingly when high temperature gelation occurs the drilling operation becomes more difficult and sometimes must cease due to the adverse changes in mud properties brought on by high temperature gelation. Moreover, in a drilling operation, particularly upon the completion of the drilling operation, it is a practice to leave behind in the well bore a fluid, commonly referred to as a packer fluid, for well completion purposes. A packer fluid usually remains within the well bore for substantial periods of time, days, weeks, months and longer, where it is subjected to a relatively high temperature, at least formation temperature under quiescent conditions. Under high temperature quiescent conditions packer fluids tend to undergo deterioration, such as high temperature gelation, and to set up into a cement-like mass if they are susceptible to high temperature gelation. Accordingly it is the practice to employ as packer fluids special fluids which do not undergo high temperature gelation and which are readily fluidizable even after relatively long periods of exposure to high temperature under quiescent conditions.

It is an object of this invention to provide a treatment of drilling muds so as to reduce the tendency of the resulting treated muds to undergo deterioration due to high temperature gelation.

It is another object of this invention to provide a method for the preparation of packer fluids from ordinary drilling muds.

It is another object of this invention to provide an improved well completion operation wherein upon the completion of the drilling operation the drilling mud is treated so that a portion of the thus-treated drilling mud may be retained in the well bore as a packer fluid.

Another object of this invention is to provide a method for improving the properties of aqueous, lime-containing drilling fluids, particularly with respect to their resistance to high temperature gelation.

How these and other objects of this invention are accomplished will become apparent in the light of the accompanying disclosure. In at least one embodiment of the practice of this invention at least one of the foregoing objects will be achieved.

It has now been discovered that drilling fluids which normally undergo high temperature gelation upon exposure to relatively high temperatures under quiescent conditions, are improved, i.e., exhibit less tendency to undergo high temperature gelation, by exposing these drilling fluids to a relatively elevated temperature while simultaneously agitating or circulating or moving the mud for a suitable period of time. After a suitable period of time the mud has been conditioned so that when subjected to a relatively elevated temperature under quiescent conditions the thus-treated mud evidences less tendency to undergo high temperature gelation.

The practice of this invention is particularly applicable to lime-containing or lime-base drilling muds, i.e., aqueous or water base drilling muds which contain an aqueous phase which is saturated with calcium hydroxide and which usually have associated therewith free, undissolved calcium hydroxide. Conventional lime-base or lime-containing drilling muds possess less than desirable high temperature gelation properties. These muds after treatment in accordance with the practice of this invention exhibit improved high temperature gelation properties.

In the practice of this invention any suitable elevated temperature may be employed as the temperature to which the mud undergoing treatment is subjected and maintained for a sufficient period of time. Usually a temperature in the range 250–450° F., more or less, is sufficient and yields satisfactory results. The period of time during which the drilling fluid undergoing treatment is subjected to the high temperature required to effect treatment in accordance with this invention in order to effect an improvement in the high temperature properties of the drilling fluid varies with the temperature to which the drilling fluid is exposed and the composition, properties and characteristics of the drilling fluid itself. More particularly, the higher the temperature the shorter is the treatment time. Moreover, the greater the tendency of the mud to undergo high temperature gelation the longer is the treatment time. Usually a treatment time in the range 1–10 days, more or less, is sufficient to effect satisfactory treatment of the drilling mud to yield a resulting drilling mud having improved high temperature gelation properties.

As indicated hereinabove, the practice of this invention is applicable to the treatment of any drilling mud which exhibits or undergoes high temperature gelation. Lime-containing drilling muds such as conventional lime-base drilling muds, e.g., a high pH lime-base drilling mud characterized by an alkaline aqueous phase having a pH in excess of 12.6, a calcium ion concentration of less than 200 p.p.m, such as a concentration in the range 20–120 p.p.m. may be suitably treated in accordance with the practice of this invention. These high pH lime-base drilling muds also contain an amount of caustic or sodium hydroxide dissolved therein such as an amount in the range ¼–6 lbs. per barrel (42 gallon) of drilling fluids.

The practice of this invention is particularly applicable to the treatment of a recently developed shale control drilling fluid as described in U.S. 2,802,783. These shale control drilling fluids are aqueous (water or oil-in-water emulsion) drilling fluids characterized by an alkaline aqueous phase saturated with calcium hydroxide and having a pH not in excess of 12.6 and a calcium ion concentration in excess of 200 p.p.m., usually in the range 300–1000 p.p.m., due to the dissolution in the aqueous phase thereof of a water soluble calcium salt having a solubility in water greater than that of calcium hydroxide.

In accordance with one feature of this invention a drilling fluid is employed in a drilling operation for the drilling of a bore hole through subsurface formations. When the drilling operation has reached a predetermined depth the drilling fluid is circulated within the bore hole while subjecting the drilling fluid to a relatively elevated temperature in the range 250–450° F. for a sufficient period of time in order to improve the high temperature gelation properties of the mud. During this treatment, i.e., exposure to a relatively high temperature while the mud is undergoing circulation, it is believed that all the chemical reactions which normally take place during high temperature gelation under quiescent conditions occur. However, in accordance with this invention the drilling fluid while being maintained at a relatively elevated temperature to effect these reactions, the drilling fluid is simultaneously agitated, moved or circulated with the result that any tendency of the solid materials, such as clay particles within the drilling fluid, to interact, clump together and flocculate and to solidify into a cement-like mass is overcome by physical contact or abrasion and by actual mechanical disruption as the drilling fluid is continuously circulated or agitated. Accordingly, after a sufficient prolonged period of time, the tendency of the thus-treated drilling fluid to undergo high temperature gelation has been substantially reduced and dissipated. Thereafter the thus-treated drilling fluid may be left behind within the well bore as a packer fluid without undue danger of high temperature gelation.

In the practice of this invention any suitable source of high temperature may be employed. A convenient source of high temperature is the subsurface formation itself, particularly if the subsurface formation temperature is rather high, such as a temperature in the range 250–450° F. If the formation temperature is not suitably high a high temperature source, such as a heat exchanger, gas fired or supplied with high temperature steam, located at the surface and/or in the immediate vicinity of the drilling operation might be employed.

The following is exemplary of the practice of this invention. A shale control drilling mud characterized by an alkaline aqueous phase having a pH of 11.5, a calcium ion concentration of about 560 p.p.m. by weight and other properties as set forth in accompanying Table I, upon being subjected to a temperature of 400° F. under quiescent conditions for a period of 96 hours exhibited a shear value of 4500 lbs. per hundred square feet. This same drilling fluid, however, after having been subjected to agitation for a period of 96 hours while the temperature of the mud was maintained at 400° F. exhibited the properties set forth in accompanying Table II.

TABLE I

*Initial properties of the drilling fluid*

| Gels | | Visc., r.p.m. | | $P_m$ | A.P.I. Water Loss 30' | $P_f$ | $M_f$ |
|---|---|---|---|---|---|---|---|
| 0 | 10' | 600 | 100 | | | | |
| 8 | 15 | 82.9 | 282.2 | 4.8 | 7.4 | 1.5 | 2.3 |

TABLE II

*Properties of drilling fluid after agitating for 96 hrs. @ 400° F.*

| Gels | | $P_m$ | pH | A.P.I. Water Loss, 30' | $P_f$ | $M_f$ | $Ca^{++}$ | Appearance |
|---|---|---|---|---|---|---|---|---|
| 0 | 10' | | | | | | | |
| 60+ | 60+ | .6 | 8.2 | 27.6 | 0 | 2.9 | 680 | Mud Still Fluid. |

Following the above treatment, agitation at a temperature of 400° F. for 96 hours, samples of the mud were selected and treated with various conventional drilling mud treating agents in order to improve the high temperature gelation properties thereof. It was observed that the untreated mud performed very satisfactorily with respect to high temperature gelation properties and these tests indicated that the addition of treating agents to improve the high temperature gelation properties of the mud was not necessary. More specifically, a sample of the drilling mud after having been subjected to agitation at 400° F. for a period of 96 hours exhibited a shear value of 575 lbs. per hundred square feet after bombing at 400° F. for 24 hours and a shear value of 640 after bombing for 72 hours at a temperature of 400° F. A sample of the same treated drilling fluid after treatment with a drilling mud additive, phenol-ethylene oxide adduct and sodium carbonate in an amount equivalent to 14 lbs. per barrel and 0.25 lbs. per barrel, respectively, yielded a drilling mud which after bombing exhibited substantially the same high temperature gelation properties and shear values, more specifically, a shear value of 550 lbs. per hundred square feet after bombing for 24 hours at 400° F. and a shear value of 575 lbs. per hundred square feet after bombing for 72 hours at 400° F. It is evident, therefore, in the light of the foregoing tests that a drilling fluid when treated in accordance with the practice of this invention exhibits substatnially improved high temperature gelation properties as evidenced by the marked reduction in shear value from a value of 4500 to a value of about 640, a percentage reduction of about 85%.

As will be apparent to those skilled in the art many modifications, changes and improvements in the practice of this invention may be made in the light of the foregoing disclosure without departing from the spirit or scope of this invention.

We claim:
1. A method of well completion which comprises drilling a bore hole through a subsurface formation to a predetermined depth while circulating a lime-containing drilling fluid down the bore hole and back to the surface, discontinuing the drilling operation when said predetermined depth is reached, continuing the circulation of said drilling fluid down the bore hole and back to the surface while at the same time subjecting the thus-circulated drilling fluid to a temperature in excess of 250° F. for a period of time in the range of from about one day to about ten days sufficient to improve the high temperature gelation properties of the thus-treated mud and subsequently leaving behind a portion of the thus-treated mud as a packer fluid within said bore hole, that portion of the treated drilling mud left behind within said well bore now exhibiting improved high temperature gelation properties under the quiescent conditions therein.

2. A method in accordance with claim 1 wherein said lime-containing drilling fluid is a water base drilling mud characterized by an alkaline aqueous phase which is saturated with calcium hydroxide, having a pH not greater than 12.6 and a water soluble calcium salt which has a solubility in water greater than that of calcium hydroxide dissolved therein so that the alkaline aqueous phase has a calcium ion concentration in excess of 200 parts per million by weight.

3. A method in accordance with claim 1 wherein said lime-containing drilling fluid is a water base drilling fluid characterized by an alkaline aqueous phase having a pH greater than 12.6, is saturated with calcium hydroxide and contains sodium hydroxide dissolved therein so that the resulting calcium ion concentration in the aqueous phase is less than 200 parts per million by weight.

References Cited in the file of this patent

UNITED STATES PATENTS

| | | |
|---|---|---|
| 2,123,282 | Jones et al. | July 12, 1938 |
| 2,491,436 | Barnes | Dec. 13, 1949 |
| 2,744,869 | Darley | May 8, 1956 |
| 2,771,420 | Rowe | Nov. 20, 1956 |
| 2,793,996 | Lummus | May 28, 1957 |
| 2,802,783 | Weiss et al. | Aug. 13, 1957 |
| 2,931,772 | Brukner | Apr. 5, 1960 |